No. 631,245. Patented Aug. 15, 1899.
H. WYMAN.
WEFT PARTING OR CUTTING MECHANISM FOR LOOMS.
(Application filed Mar. 3, 1899.)
(No Model.) 2 Sheets—Sheet 1.
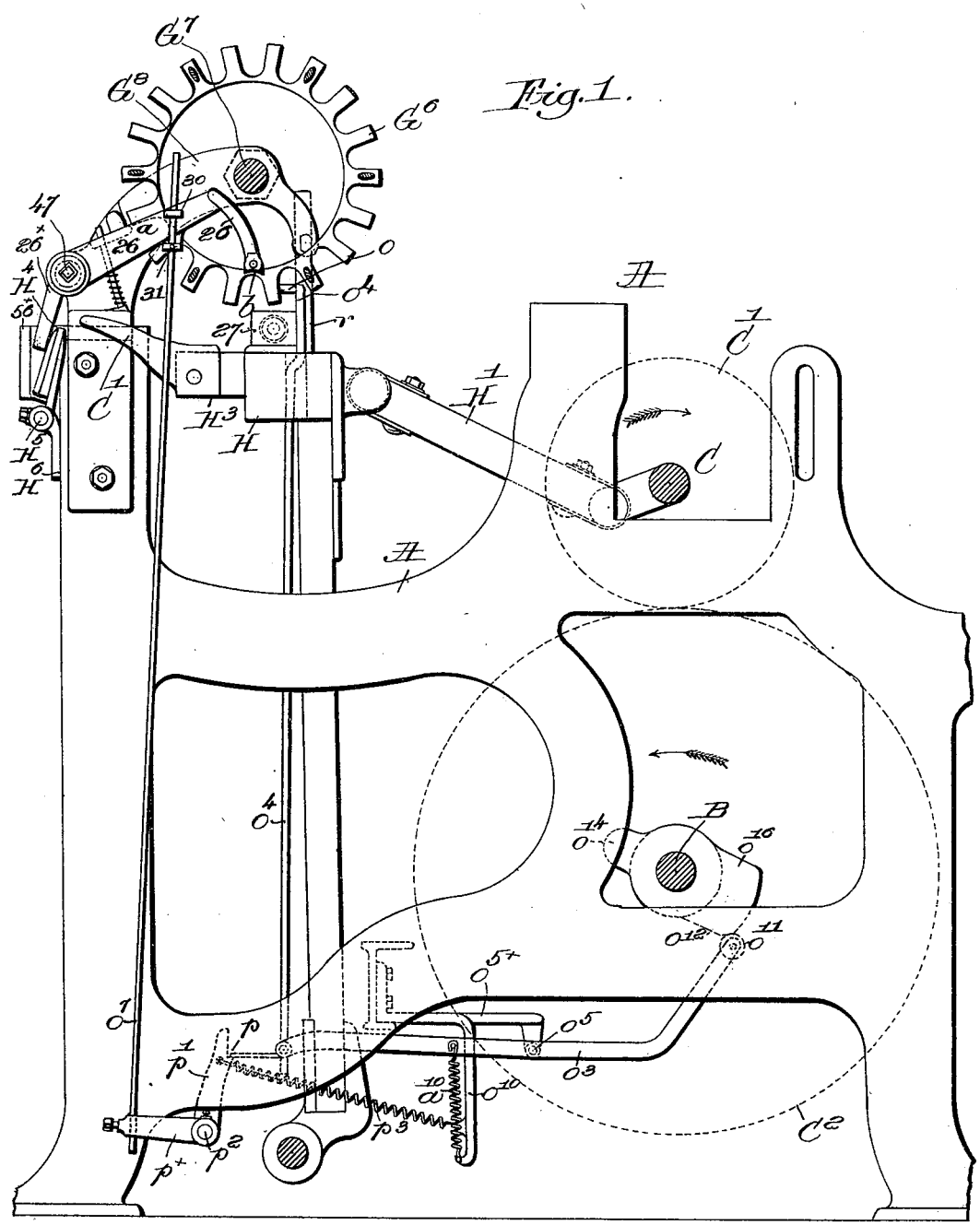
WITNESSES. INVENTOR.

No. 631,245. Patented Aug. 15, 1899.
H. WYMAN.
WEFT PARTING OR CUTTING MECHANISM FOR LOOMS.
(Application filed Mar. 3, 1899.)
(No Model.) 2 Sheets—Sheet 2.
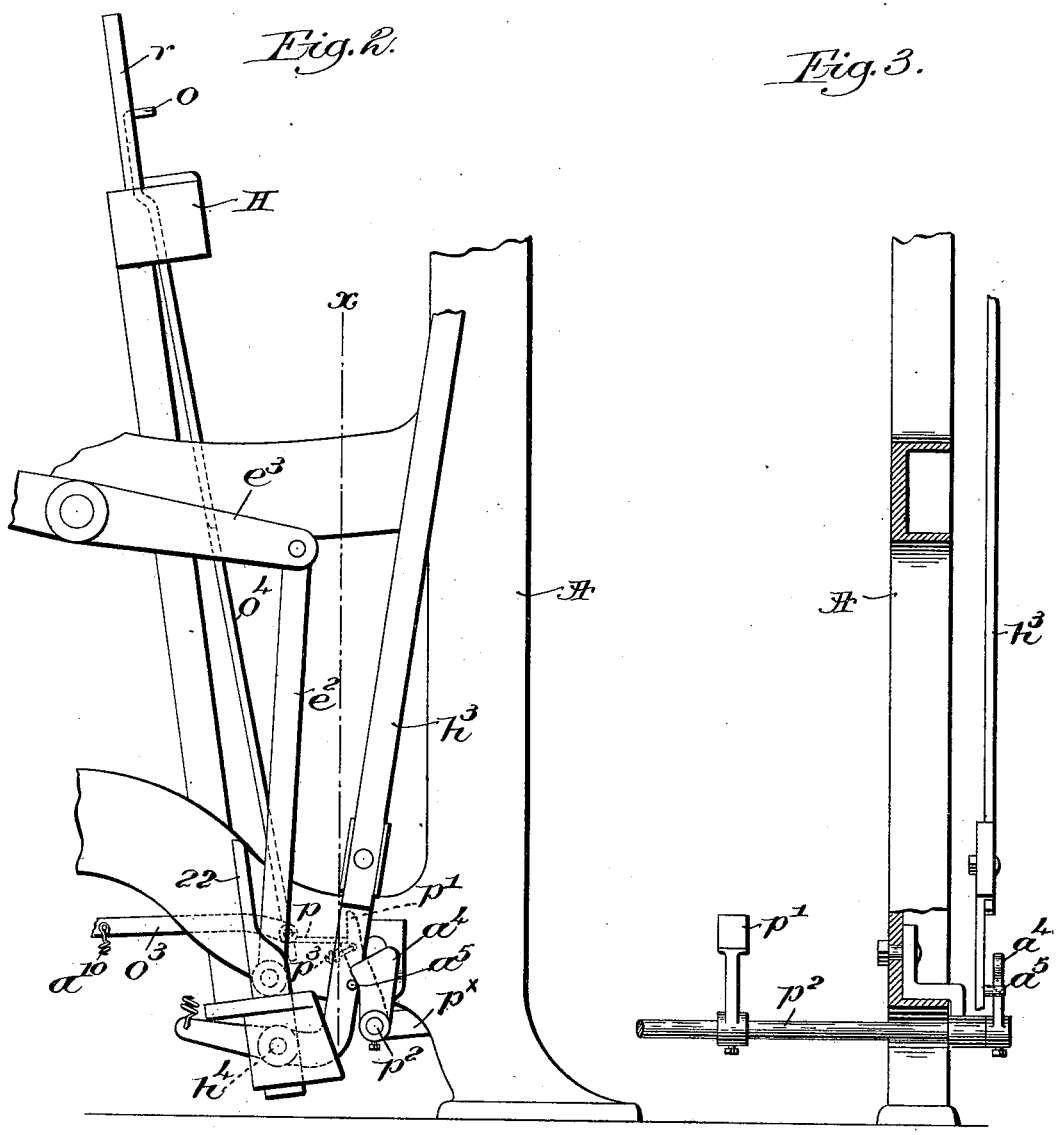
Witnesses:
Fred S. Greenhof.
Edward F. Allen.
Inventor:
Horace Wyman,
by Crosby & Gregory
attys.

UNITED STATES PATENT OFFICE.

HORACE WYMAN, OF WORCESTER, MASSACHUSETTS, ASSIGNOR TO THE CROMPTON & KNOWLES LOOM WORKS, OF SAME PLACE.

WEFT PARTING OR CUTTING MECHANISM FOR LOOMS.

SPECIFICATION forming part of Letters Patent No. 631,245, dated August 15, 1899.

Application filed March 3, 1899. Serial No. 707,574. (No model.)

*To all whom it may concern:*

Be it known that I, HORACE WYMAN, of Worcester, county of Worcester, State of Massachusetts, have invented an Improvement in Weft Parting or Cutting Mechanism for Looms, of which the following description, in connection with the accompanying drawings, is a specification, like letters and figures on the drawings representing like parts.

In the class of looms shown in United States Patent No. 600,053, dated March 1, 1898, provided with automatic filling-supplying mechanism to supply fresh filling to the race of the lay and shed, the filling if changed before it is fully exhausted has to be parted or cut at two successive beats of the lay. The filling extended from the shuttle to the selvage and yet connected with the filling-carrier just removed from the running shuttle has to be cut or parted, and so, also, the fresh filling on the filling-carrier just put into the shuttle and carried through the shed, said filling being yet connected at one end to a filling-end holder and occupying, preferably, a fixed position, must be parted or severed by the second cut. So, also, in the class of looms shown in United States Patent No. 614,369, dated November 15, 1898, wherein the filling-supplying mechanism acts to feed on the race of the lay another or fresh shuttle with fresh filling, the filling in the shuttle, which is removed before it is fully exhausted, must be parted or cut and also in some cases the filling extended from the fresh shuttle to a filling-end holder.

Herein I employ novel mechanism for parting or cutting the filling. The knife employed to part or cut the filling acts only at predetermined times, and I have chosen to actuate the said knife from or through the arm or lever which is moved only as the fresh filling is supplied, the starting of said arm or lever to effect a change of filling starting into operation a suitable cam to actuate the knife used to cut or part the filling. This knife is actuated first to cut the filling leading from the selvage to the ejected filling-carrier, and immediately afterward, at the next forward position of the lay, the said knife is again actuated to make a second stroke, and thereafter it is put again in its inoperative position, where it remains until fresh filling is again supplied.

I have herein chosen to show my invention embodied with parts of two looms hereinbefore specifically mentioned; but it will be understood that the devices herein shown and described may with but slight changes be applied to any other usual loom of the class referred to.

Figure 1 represents my improvements applied to a sufficient portion of a loom, such as represented in United States Patent No. 600,053, to enable my invention to be understood. Fig. 2 shows my improvements applied to a loom such as represented in United States Patent No. 614,369. Fig. 3 shows another view of the loom represented in Fig. 2.

Referring to Fig. 1, A designates the loom-frame; B, the cam-shaft; C, the crank or lay shaft; C', a gear thereon engaging a larger gear $C^2$, fast on the main shaft. $G^6$ is a battery to contain filling-carriers, (not shown;) $G^7$, a stud to support said battery; $G^8$, an arm sustaining said stud. $26^a$ is an arm or lever having a branch 26 and an extension $26^\times$. H represents the lay; H', the lay connecting-rod; $H^3$, a bunter; $H^5$, a sliding rock-shaft having a projection $H^4$ at one end, which is adapted to be put in position between the bunter carried by the lay and the end $26^\times$ of the arm or lever $26^a$ whenever a filling-carrier is to be taken from said battery and put into a shuttle, as 27, in the shuttle-box to thereby supply fresh filling for the filling just in use. $56^\times$ is an arm in line with the filling-fork slide, and $H^6$ is an arm.

The parts above referred to by letters and figures are all substantially as shown by like letters and figures in said Patent No. 600,053, so they need not be herein further specifically described.

To effect the two cuts referred to in succession, I provide the lay with a knife o, locating it outside the selvage-line, said knife having the under side of its laterally-bent acting end sharpened to act on and part or cut the filling lying on the race of the lay in front of the dents of the reed r. The knife o is carried by a rod $o^4$, free to slide up and down in the lay, said rod being jointed loosely at its lower end to a lever $o^3$, pivoted at $o^5$ on a suitable stand $o^{5\times}$, bolted to the loom-frame, said lever having at its opposite end a roller or other stud $o^{11}$, which is adapted to be operated upon by a suitable double-acting cam $o^{14}$ and $o^{16}$, fast on the cam-shaft B. The front end of the lever $o^3$ has a projection $p$, which when the cutter occupies its inoperative elevated position rests on a suitable detaining device $p'$, shown as a latch connected with a rock-shaft $p^2$, a spring $p^3$, connected with said detaining device and with an arm $o^{10}$ of said stand $o^{5\times}$, acting to keep said detaining device in position to support the free end of the lever $o^3$, and in such condition the roller $o^{11}$ is held normally out of the operative range of the cam $o^{16}$ and $o^{14}$. The lever $o^3$ has connected to it a spring $a^{10}$, which acts, when permitted, to move the lever $o^3$ and cause its roller to follow the surface of said double cam $o^{16}$ and $o^{14}$. The rock-shaft $p^2$ has an extended arm $p^\times$, to which is connected a rod $o^7$, the upper end of which is suitably connected with the arm or lever $26^a$, it carrying at its end a suitable surface $b$ to contact with a filling-carrier supposed to be supported in the battery $G^6$ and located immediately under the said surface $b$, the movement of the arm $26^a$ putting said filling-carrier into the shuttle. The connection of the rod $o^7$ is made with said arm by passing the rod through a suitable ear 30, extended from said arm, and as said arm is depressed said ear meets a stop or lug 31, fast on the rod $o^7$, and depresses it, turning the detaining device $p'$ in opposition to the spring $p^3$, thus releasing the free end of the lever $o^3$, letting the spring $a^{10}$ act to depress the knife and cut the filling between the selvage and the shuttle, through which the carrier has just been discharged. As the spring $a^{10}$ acts to depress the knife at this first stroke the roller-stud $o^{11}$ travels on the inclined surface $o^{12}$ of the cam $o^{16}$, and during this time the shuttle containing the fresh filling is thrown across the lay, and to cut the fresh filling inserted by said shuttle in the shed and extending from the selvage to the filling-end holder the cam $o^{14}$ acts to move the lever $o^3$ and lift it high enough to let the fresh filling come into position on the lay in front of the reed under the knife, so that as the lay again arrives in its forward position the cam $o^{14}$ will pass the roller $o^{11}$, and again the spring $a^{10}$ will act to depress the knife to make a second cut and sever the fresh filling.

The cam $o^{14}$, it will be noticed, does not lift the lever $o^3$ far enough to put its free end above the detaining device; but in the further rotation of the shaft B the cam $o^{16}$ comes into action, and two cuts having been made in succession the lever $o^3$ is moved sufficiently to put its free end above the notch of the detaining device, letting said device under the action of the spring $p^3$ act to catch and lock the knife in its inoperative position.

It will be understood from the foregoing that the lever $o^3$ remains locked so long as the loom is running regularly, and it is actuated only after the lever or arm $26^a$ is moved to supply a fresh filling-carrier or fresh filling to the lay.

Referring to Figs. 2 and 3, Fig. 3 being a view of part of Fig. 2 taken from the left of the dotted line $x$, Fig. 2, I have shown my invention applied to a loom of the kind represented in United States Patent No. 614,369, dated November 15, 1898. In these figures the loom-frame A, the lever $e^3$, and the link $e^2$, connected with the slide 22, having pivoted on it at $h^4$ a lever or arm $h^3$, forming part of the shuttle presenter or device used to supply the lay with fresh filling in the form of a shuttle containing a wound cop or bobbin, are and may be all substantially as designated by like letters in said patent. The knife $o$, carried by a rod $o^4$, jointed to lever $o^3$, which may be pivoted on a suitable stand, (not shown,) is and may be as described herein with relation to Fig. 1. The free end of the lever $o^3$ in this instance is caught by a detaining device $p'$, connected with a rock-shaft $p^2$, and in practice said detaining device will have coöperating with it a spring, as provided for in said Fig. 1. The opposite end of the shaft $c^2$ has a cam-shaped arm $a^4$, which is borne normally against a pin $a^5$, extended from the arm or lever $h^3$, said pin acting whenever said arm or lever is raised by the movement of the lever $e^3$, as provided for in said Patent No. 614,369, in order that said arm or lever may be turned toward the advancing lay, as provided for therein, to supply the race with a fresh shuttle, said pin $a^5$ acting against said cam $a^4$, turning said rock-shaft and with it the detaining device $p'$, letting the spring $a^{10}$, connected therewith and to a fixed part of the loom, act on the lever $o^3$ and depress the knife $o$ quickly to cut or part the filling extended from the shuttle being discharged to the selvage.

The rear end of the lever $o^3$ may in practice be acted upon by a cam, substantially as provided for in Fig. 1 herein to impart a second stroke to the knife at the succeeding forward stroke of the lay in order that the knife may make a second cut on the filling which may be under it, said filling having just been put into the shed by a fresh shuttle, said filling being extended from the selvage to a weft-end holder substantially such as described in said Patent No. 614,639, the lever being lifted immediately after the second operation of the knife far enough to be again caught and held by the detainer $p'$ until a fresh shuttle is again put on the race of the lay.

It will be noticed in both forms of loom herein described that the arm or lever $26^a$ and the arm or lever $h^3$ are each instrumental in supplying fresh filling to the lay and that the movement of each of said arms or levers effects the release of the devices instrumental in operating the knife, and hence in the claims I shall designate the lever $26^a$ and $h^3$ by the term "filling-supplying means." It will also be noticed herein that the knife-operating mechanism is sustained upon the loom-frame at or near the fulcrum of the lay, so that the lay has only to carry back and forward with it the knife and its rod $o^4$, which is jointed to the lever $o^3$, and hence the knife is always in position, and its weight does not add materially to increase the momentum of the lay.

This filling-parting mechanism may be readily adapted to part the filling being discharged and not part the filling coming onto the lay to enter the shed, if it should be required so to do, and this can be done by merely increasing the throw of the cam $o^{14}$, so that it will act to lift the lever and put it in position to be engaged by the detaining device, or the cam $o^{14}$ might be entirely omitted, in which case the knife or parting device would remain down during one forward stroke of the lay.

Having described my invention, what I claim as new, and desire to secure by Letters Patent, is—

1. A lay, a filling-parting device carried thereby, means to normally detain said parting device in its inoperative position, filling-supplying means to supply filling to the lay, a device intermediate the means for detaining the said parting device in its inoperative position and said filling-supplying means to actuate the means for detaining the said parting device and cause said parting device to be released to part the filling whenever the filling-supplying means is operated to supply fresh filling to the lay, substantially as described.

2. A lay, a filling-parting device carried thereby, a lever pivoted independently of the lay and to which said filling-parting device is jointed, means to operate said lever to lift said filling-parting means twice in succession at two successive strokes of the lay, and a spring to operate said parting device once in one direction between said successive strokes of the parting device, substantially as described.

3. A lay, a filling-parting device, a lever pivoted independently of the lay and to which said parting device is jointed near the center of motion of the lay; combined with means to move said parting device to cut the filling, substantially as described.

4. In a loom, a lay, a filling-parting device carried thereby, means to supply the lay and the shed of the warp with filling, and means between said filling-supplying means and said detaining means and actuated as the filling-supplying means is moved in the act of supplying fresh filling to automatically move said detaining means to enable said parting device to descend and part the filling lying on the race of the lay, substantially as described.

5. The lay, a filling-parting device carried thereby, a lever with which said filling-parting device is connected, a detaining device to hold said parting device in its inoperative position, means to actuate said detaining device to release said lever after the lay has been provided with a fresh supply of filling, and a spring to then actuate the said parting device to part the filling lying on the race of the lay, substantially as described.

6. In a loom, a lay, a filling-parting device, a lever with which it is connected, a detaining device to engage said lever and hold said parting device in its elevated inoperative position, means for supplying fresh filling, connections controlled by said means for supplying filling to release said lever, and means to actuate said lever and start said knife to part outside the selvage the first shot of fresh filling laid on the lay and extended through the shed, substantially as described.

7. A lay, a filling-parting device, a lever connected therewith, a cam and means to actuate it to move said lever and put the parting device in its inoperative position, and means to automatically engage and lock said lever in such position, substantially as described.

8. A lay, filling-supplying means, a filling-parting device, and actuating means therefor, combined with a detaining device to lock and hold said actuating means and filling-parting device in their inoperative position, and connections between said filling-supplying means and said detaining device to move the latter to release the means for actuating the filling-parting device when fresh filling is supplied to the race of the lay and shed, substantially as described.

9. A lay, a filling-parting device, a lever with which it is connected, a shaft, a main cam carried by it to move said lever and lift said parting device into its inoperative position, a detaining device to lock said parting device in its elevated inoperative position, means to actuate said detaining means to release said parting device, means to effect the descent of said parting device to cut the filling lying under it on the lay, and a second cam carried by said shaft to give to said lever and its connected device a shorter upward throw preparatory to its making a second downward movement to cut filling a second time, the second downward movement of the filling being followed by a second action of the main cam to put the parting device in its inoperative elevated position where it remains until fresh filling is again supplied, substantially as described.

10. A lay, a filling-parting device composed of a blade and a rod, the latter fitted to slide vertically through the lay, a lever mounted on a fulcrum detached from the lay, said lever being connected with said rod; combined with a cam-shaft having a cam, and a spring to actuate said lever and parting device, substantially as described.

11. A lay, a filling-parting device composed of a blade and a rod fitted to slide vertically through the lay, a lever with which said rod is connected, a fulcrum for said lever, a cam, a cam-shaft, and a spring to actuate said lever and parting device; combined with a catch to keep said parting device in its inoperative position until the filling is to be parted, and means to trip said catch, substantially as described.

12. In a loom, a lay, a filling-parting device, a lever with which it is connected, a detaining device to engage said lever and hold said parting device in its elevated inoperative position, filling-supplying means to supply fresh filling, connections controlled by the means for supplying filling to release said lever as said means is operated to supply filling, and means to thereafter operate said lever and lift it twice in succession that it may operate twice to cut filling, the connecting device thereafter engaging said lever and holding the detaining device in its inoperative position, substantially as described.

13. In a loom, a weft-parting device, a detaining device to detain said weft-parting device in its inoperative position, a spring to depress said parting device, weft-supplying means consisting of a movable lever having a projection, and means actuated by the projection from said lever to move said detainer to release the parting device that it may be actuated by its spring to part the filling at the proper time, substantially as described.

14. In a loom, a lay; a filling-parting device carried thereby; a filling-supplying mechanism to supply the lay with a carrier provided with fresh filling and to discharge the running filling-carrier; detaining means to normally hold said parting device in its inoperative position, and means actuated by the filling-supplying means to cause the parting device to be released to part the filling below it whenever the filling-supplying means is operated to discharge the running filling-carrier from the lay.

In testimony whereof I have signed my name to this specification in the presence of two subscribing witnesses.

HORACE WYMAN.

Witnesses:
JUSTIN A. WARE,
GEORGE CROMPTON.